United States Patent
Yang et al.

(10) Patent No.: US 9,779,486 B2
(45) Date of Patent: Oct. 3, 2017

(54) IMAGE PROCESSING APPARATUS AND IMAGE PROCESSING METHOD

(71) Applicant: Novatek Microelectronics Corp., Hsinchu (TW)

(72) Inventors: Mei-Juan Yang, ShaanXi Province (CN); Jian-Hua Liang, ShaanXi Province (CN); Yuan-Jia Du, Shandong Province (CN)

(73) Assignee: Novatek Microelectronics Corp., Hsinchu (TW)

( * ) Notice: Subject to any disclaimer, the term of this patent is extended or adjusted under 35 U.S.C. 154(b) by 175 days.

(21) Appl. No.: 14/850,977

(22) Filed: Sep. 11, 2015

(65) Prior Publication Data
US 2017/0053176 A1  Feb. 23, 2017

(30) Foreign Application Priority Data

Aug. 20, 2015  (CN) .......................... 2015 1 0513724

(51) Int. Cl.
| | |
|---|---|
| *G06K 9/00* | (2006.01) |
| *G06T 5/00* | (2006.01) |
| *G06T 5/20* | (2006.01) |

(52) U.S. Cl.
CPC .............. *G06T 5/002* (2013.01); *G06T 5/20* (2013.01); *G06T 2207/20192* (2013.01)

(58) Field of Classification Search
CPC .. G06T 5/002; G06T 5/20; G06T 2207/20192
See application file for complete search history.

(56) References Cited

U.S. PATENT DOCUMENTS 6,661,469 B1 * 12/2003 Kawabata .............. H04N 5/142
                                                    345/63
7,209,182 B2     4/2007 Kawabata et al.
(Continued)

FOREIGN PATENT DOCUMENTS

| CN | 1297643 | 5/2001 |
|---|---|---|
| TW | 200606786 | 2/2006 |

(Continued)

OTHER PUBLICATIONS

"Office Action of Taiwan Counterpart Application", dated Oct. 24, 2016, p. 1-p. 5.

*Primary Examiner* — John Strege
(74) *Attorney, Agent, or Firm* — Jianq Chyun IP Office

(57) ABSTRACT

An image processing apparatus and method thereof are provided. The image processing apparatus includes a false contour detection circuit and a false contour reduction circuit. The false contour detection circuit includes detection modules and a determination module. The detection modules respectively detect different features of the same image input signal and correspondingly output feature coefficients. The determination module is coupled to the detection modules and determines a false contour coefficient according to the feature coefficients. The false contour reduction circuit is coupled to the determination module of the false contour detection circuit to receive the false contour coefficient and perform false contour reduction on the image input signal according to the false contour coefficient, so as to output a corresponding image output signal.

28 Claims, 10 Drawing Sheets

(56) References Cited

U.S. PATENT DOCUMENTS

| | | | |
|---|---|---|---|
| 7,990,343 B2 * | 8/2011 | Takahashi | G09G 3/2003 345/63 |
| 8,243,785 B2 | 8/2012 | Weitbruch et al. | |
| 8,532,198 B2 * | 9/2013 | Kumwilaisak | H04N 19/154 375/240.08 |
| 2003/0076335 A1 * | 4/2003 | Lai | G09G 3/2029 345/589 |
| 2004/0008282 A1 | 1/2004 | Kawabata et al. | |
| 2006/0233456 A1 * | 10/2006 | Ahn | G06T 7/13 382/275 |
| 2007/0237229 A1 | 10/2007 | Weitbruch et al. | |
| 2009/0060375 A1 * | 3/2009 | Lim | G06T 5/002 382/266 |
| 2009/0067741 A1 | 3/2009 | Lee et al. | |
| 2010/0053200 A1 * | 3/2010 | Correa | H04N 1/64 345/600 |

FOREIGN PATENT DOCUMENTS

| | | |
|---|---|---|
| TW | 200617868 | 6/2006 |
| TW | 200803497 | 1/2008 |
| TW | 200913667 | 3/2009 |

\* cited by examiner

IMAGE PROCESSING APPARATUS AND IMAGE PROCESSING METHOD

CROSS-REFERENCE TO RELATED APPLICATION

This application claims the priority benefit of China application serial no. 201510513724.0, filed on Aug. 20, 2015. The entirety of the above-mentioned patent application is hereby incorporated by reference herein and made a part of this specification.

BACKGROUND

Field of the Invention

The invention is directed to an image processing technique and more particularly, to an image processing apparatus and an image processing method.

Description of Related Art

Banding artifacts (or false contours) often occurs in an image after quantization of the intensity (e.g., chroma or luminance). With the increase of display sizes, the false contours become more obvious. Before a false contour is removed, a system has to perform false contour detection on the image in advance. False contour are low-frequency components in an image while edges and textures are high-frequency components therein. Therefore, in a conventional method of detecting the false contours, only gradient-based method is commonly adopted to separate the false contours from the edges and textures.

However, a change of small details (e.g., weak edges and fine textures) in the image is approximate to a change of the false contours. The conventional method cannot distinguish the small details from the false contours. When a weak edge (for example, a cloud in the sky) or a fine texture (e.g., fur of animals or a grassland) is mistakenly detected as a false contour, the weak edge or fine texture will be smoothed. As a result, the conventional method of detecting the false contours would lead to loss of part of the image details.

SUMMARY

The invention provides an image processing apparatus and an image processing method capable of effectively detecting a false contour in an image input.

According to an embodiment of the invention, an image processing apparatus including a false contour detection circuit and a false contour reduction circuit is provided. The false contour detection circuit is configured to detect an image input signal. The false contour detection circuit includes a plurality of detection modules and a determination module. The detection modules respectively detect different features of the same image input signal and correspondingly output a plurality of feature coefficients. The determination module is coupled to the detection modules to determine a false contour coefficient by using the feature coefficients. The false contour reduction circuit is coupled to the determination module of the false contour detection circuit to receive the false contour coefficient. The false contour reduction circuit is configured to perform false contour reduction on the image input signal according to the false contour coefficient, so as to correspondingly output an image output signal.

According to an embodiment of the invention, an image processing method adapted for an image processing apparatus is provided. The image processing method includes: detecting different features of an image input signal respectively by a plurality of detection modules, so as to correspondingly generate a plurality of feature coefficients; determining a false contour coefficient by using the feature coefficients by a determination module; and performing false contour reduction on the image input signal according to the false contour coefficient, so as to correspondingly output an image output signal.

To sum up, the image processing apparatus and the image processing method provided by the embodiments of the invention can detect different features of the same image input signal. According to the different features, the determination module can determine the false contour coefficient to recognize the false contour in the image. The false contour reduction circuit can perform the false contour reduction on the image input signal according to the false contour coefficient, and thereby, image details (e.g., weak edges or fine textures) can be prevented from being lost.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic chart illustrating a scenario of the horizontal gradient calculator depicted in FIG. 5 calculating a gradient value of the current pixel along the horizontal direction of the image frame according to an embodiment of the invention.

FIG. 7 is a schematic chart illustrating a scenario of the vertical gradient calculator 513 depicted in FIG. 5 calculating a gradient value of the current pixel along the vertical direction of the image frame according to an embodiment of the invention.

FIG. 8 is a schematic chart illustrating a scenario of the first diagonal gradient calculator depicted in FIG. 5 calculating a gradient value of the current pixel along a diagonal direction of the image frame according to an embodiment of the invention.

FIG. 9 is a schematic chart illustrating a scenario of the second diagonal gradient calculator depicted in FIG. 5 calculating a gradient value of the current pixel along an anti-diagonal direction of the image frame according to an embodiment of the invention.

DESCRIPTION OF EMBODIMENTS

Figure 1:
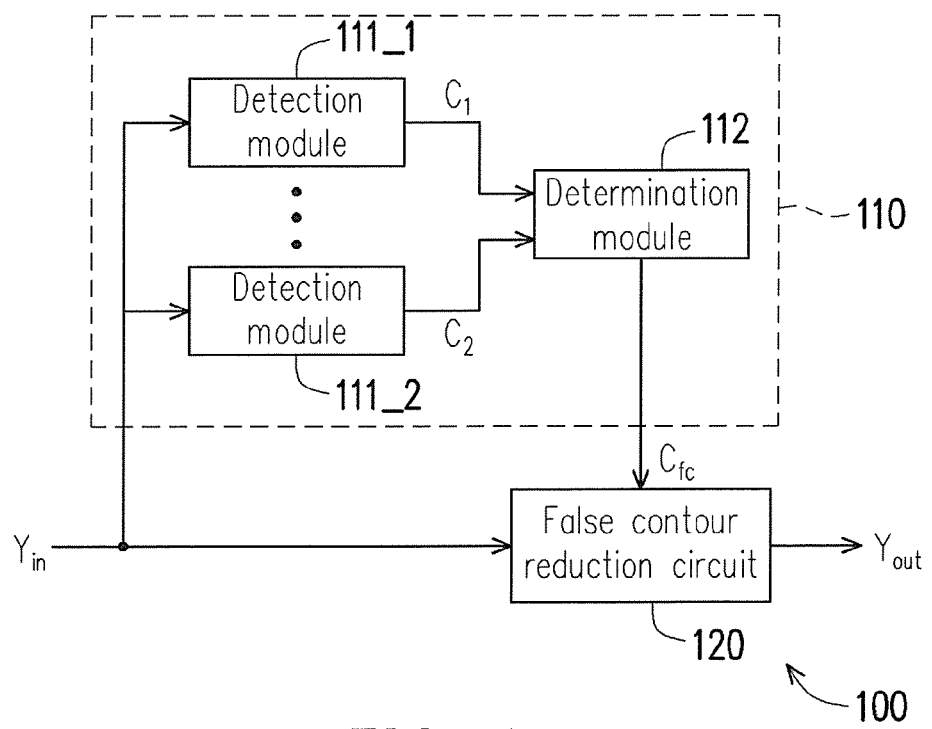
FIG. 1 is a schematic block diagram illustrating an image processing apparatus according to an embodiment of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic block diagram illustrating an image processing apparatus 100 according to an embodiment of the invention. In the present embodiment, the image processing apparatus 100 may be applied between an image input apparatus (e.g., a DVD player, which is not shown) and a display (e.g., a TV, which is not shown), which is not limited in the present embodiment. The image processing apparatus 100 may perform false contour reduction on an image input signal $Y_{in}$ provided by the image input apparatus (not shown), so as to output an image output signal $Y_{out}$. Thereby, the image processing apparatus 100 may contribute to mitigating false contour (or banding artifacts).

The image processing apparatus 100 includes a false contour detection circuit 110 and a false contour reduction circuit 120. The false contour detection circuit 110 receives the image input signal $Y_{in}$ from a former circuit (not shown). The image input signal $Y_{in}$ may be any type of image signal. For instance (but not limited to), the image input signal $Y_{in}$ may be a red signal, a green signal, a blue signal, luminance signal, a chrominance signal, a chroma signal or any other component signal of an image signal. The false contour detection circuit 110 may detect different features of the same image input signal $Y_{in}$ and correspondingly output a false contour coefficient $C_{fc}$ according to the different features to the false contour reduction circuit 120. A value range of the false contour coefficient $C_{fc}$ may be determined depending on design requirements. In some application examples, the false contour coefficient $C_{fc}$ may be a real number between 0 and 1.

In this description, an image processing method adapted for an image processing apparatus 100 comprises: detecting different features of an image input signal $Y_{in}$ respectively by a plurality of detection modules, so as to correspondingly generate a plurality of feature coefficients; determining the false contour coefficient $C_{fc}$ by using the feature coefficients by a determination module; and performing false contour reduction on the image input signal $Y_{in}$ according to the false contour coefficient $C_{fc}$, so as to correspondingly output an image output signal $Y_{out}$. In the embodiment illustrated in FIG. 1, the false contour detection circuit 110 includes a plurality of detection modules (e.g., detection modules 111_1, ..., 111_2 illustrated in FIG. 1) and a determination module 112. The detection modules 111_1 to 111_2 may respectively detect different features of the image input signal $Y_{in}$ and correspondingly output a plurality of feature coefficients $C_1$, ..., $C_2$ to the determination module 112. The determination module 112 is coupled to output terminals of the detection modules 111_1 to 111_2. The determination module 112 may determine the false contour coefficient $C_{fc}$ according to the feature coefficients $C_1$ to $C_2$.

Figure 2:
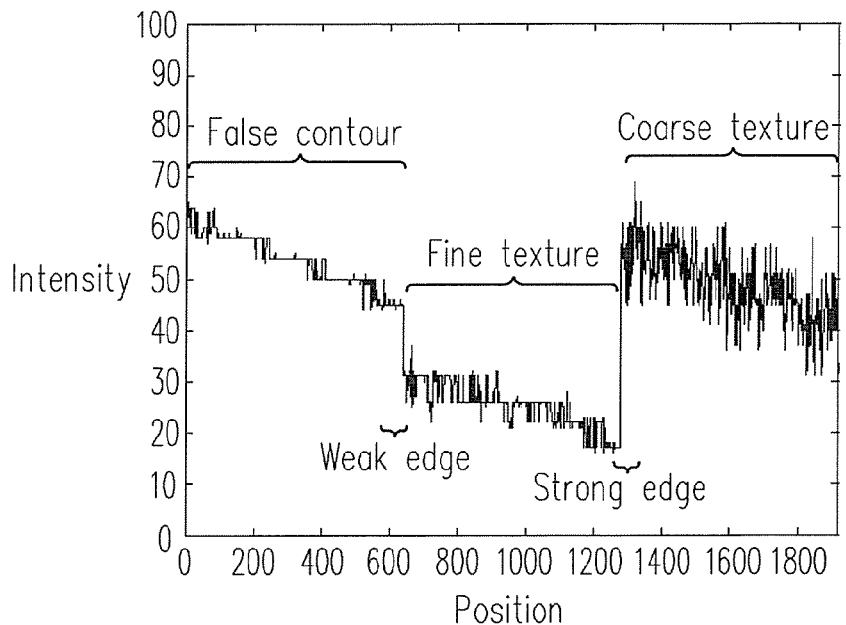
FIG. 2 is a schematic graph illustrating a relation between pixel positions and pixel intensities of the image input signal according to an embodiment of the invention.

FIG. 2 is a schematic graph illustrating a relation between pixel positions and pixel intensities of the image input signal $Y_{in}$ according to an embodiment of the invention. In FIG. 2, the horizontal axis represents a position of a pixel, and the vertical axis represents an intensity (e.g., a luminance or a color) of the pixel. FIG. 2 illustrates, in a 1-dimensional (1-D) manner, intensities corresponding to different positions of the pixel in a 1-D space. In any way, persons with ordinary skill in the art can infer the content related to FIG. 2 to a 2-dimensional (2-D) space based on the teaching provided in this disclosure. Pixel positions (approximately from pixel positions 1300 to 1900 along the horizontal axis) having coarse textures of an image are illustrated in the right of FIG. 2, pixel positions (approximately from pixel positions 650 to 1250 along the horizontal axis) having fine textures of the image are illustrated in the middle of FIG. 2, and pixel positions (approximately from pixel positions 0 to 600 along the horizontal axis) having false contours are illustrated in the left of FIG. 2. There are strong edges between the coarse textures illustrated in the right of FIG. 2 and the fine textures illustrated in the middle of FIG. 2, while there are weak edges between the fine textures illustrated in the middle of FIG. 2 and the false contours illustrated in the left of FIG. 2.

During image processing (e.g., quantization of the intensity), a smooth gradation in an image may be converted into a step change. Such strip-like step change is referred to as a false contour or a banding artifact. The step change illustrated in the left of FIG. 2 is a false contour of the image input signal $Y_{in}$. The different detection modules 111_1 to 111_2 of the false contour detection circuit 110 may detect different features of the image input signal $Y_{in}$, and correspondingly output a plurality of feature coefficients $C_1$, ..., $C_2$ to the determination module 112. For example (but not limited to), the detection module 111_1 may include an edge detection unit, and the detection modules 111_2 may include a texture detection unit. The edge detection unit of the detection module 111_1 is coupled to the determination module 112. The edge detection unit of the detection module 111_1 may detect whether a current pixel of the image input signal $Y_{in}$ is an edge and correspondingly output a first feature coefficient $C_1$ to the determination module 112. The texture detection unit of the detection module 111_2 is coupled to the determination module 112. The texture detection unit of the detection module 111_2 may detect a texture in an adjacent range of the current pixel and correspondingly output a second feature coefficient $C_2$ to the determination module 112. The determination module 112 may determine the false contour coefficient $C_{fc}$ according to the feature coefficients $C_1$ to $C_2$ and output the false contour coefficient $C_{fc}$ to the false contour reduction circuit 120. Thus, the false contour detection circuit 110 may recognize an edge (e.g., a strong edge or a weak edge illustrated in FIG. 2) and a texture (e.g., a coarse texture or a fine texture illustrated in FIG. 2) in the image input signal $Y_{in}$, so as to enhance the accuracy of recognizing the false contour.

Referring to FIG. 1, the false contour reduction circuit 120 is coupled to the output terminal of the determination module 112 of the false contour detection circuit 110 to receive the false contour coefficient $C_{fc}$. The false contour reduction circuit 120 may gather the false contour coefficient $C_{fc}$ to obtain a false contour map. Thus, the false contour reduction circuit 120 may perform the false contour reduction on the image input signal $Y_{in}$ according to the false contour coefficient $C_{fc}$, so as to output the corresponding image output signal $Y_{out}$.

Figure 3:
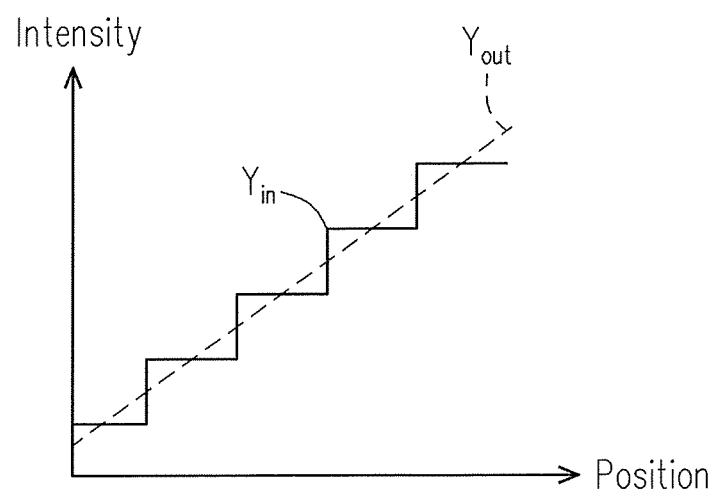
FIG. 3 is a schematic graph illustrating the false contour reduction performed on the image input signal in the pixel region of the false contour by the false contour reduction circuit according to an embodiment of the invention.

FIG. 3 is a schematic graph illustrating the false contour reduction performed on the image input signal $Y_{in}$ in the pixel region of the false contour by the false contour reduction circuit 120 according to an embodiment of the invention. In FIG. 3, the horizontal axis represents a position of a pixel, and the vertical axis represents an intensity (e.g., a luminance or a color) of a pixel. FIG. 3 illustrates, in a 1-D manner, pixel intensities corresponding to different positions in a 1-D space. In any way, the persons with ordinary skill in the art can infer the content related to FIG. 3 to a 2-D space based on the teaching provided in this disclosure. The false contour reduction circuit 120 may obtain a false contour region of the image input signal $Y_{in}$ according to the false contour coefficient $C_{fc}$. In the false contour region, the false contour reduction circuit 120 may perform the false contour reduction on the image input signal $Y_{in}$, so as to output a smoothed image output signal $Y_{out}$, as shown in FIG. 3.

Figure 4:
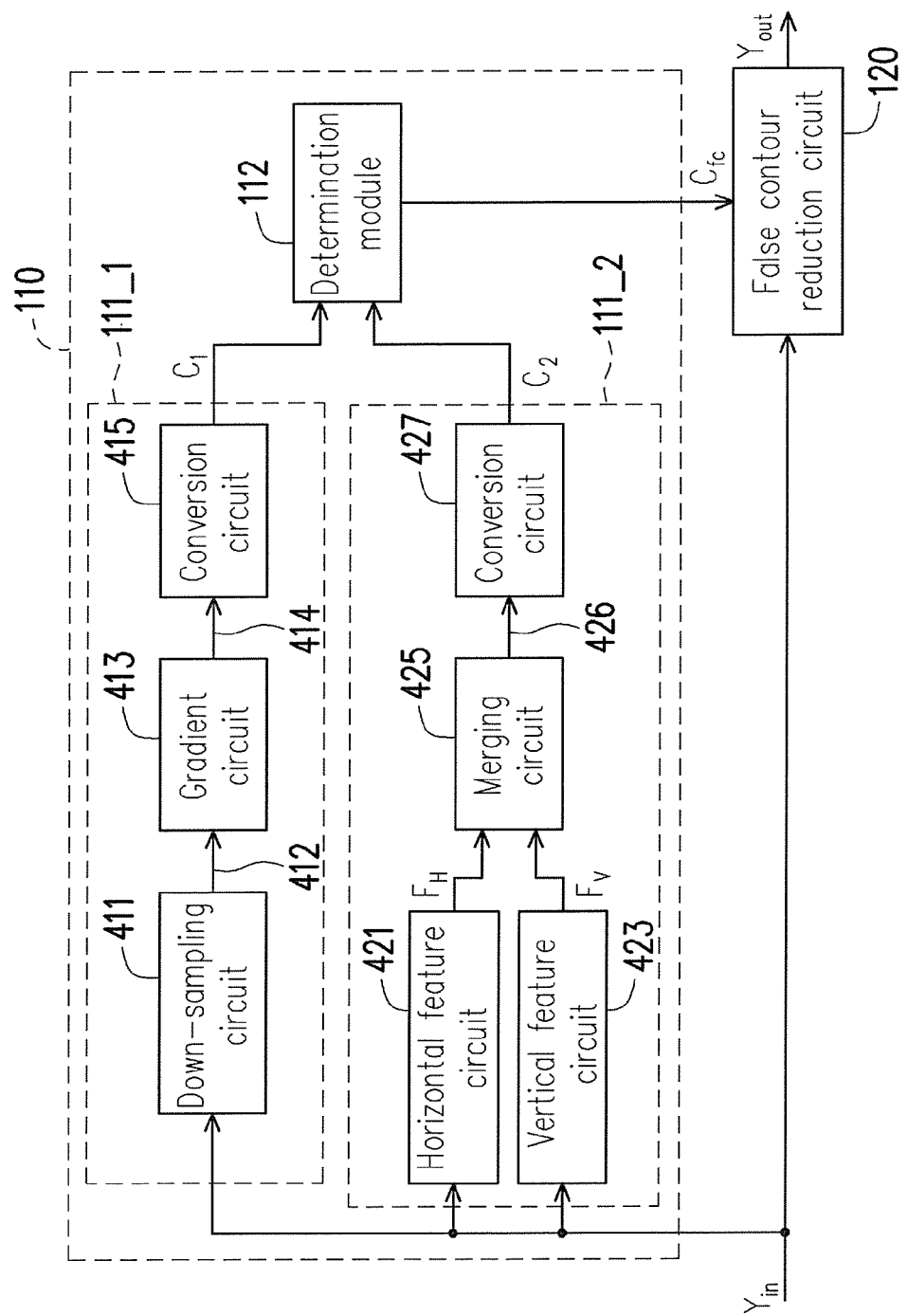
FIG. 4 is a schematic block circuit diagram illustrating the false contour detection circuit depicted in FIG. 1 according to an embodiment of the invention.

FIG. 4 is a schematic block circuit diagram illustrating the false contour detection circuit 110 depicted in FIG. 1 according to an embodiment of the invention. Referring to FIG. 4, the detection module 111_1 includes an edge detection unit, and the detection module 111_2 includes a texture detection unit. The edge detection unit of the detection module 111_1 includes a down-sampling circuit 411, a gradient circuit 413 and a conversion circuit 415. The down-sampling circuit 411 may down-sample image pixels and correspondingly output a down-sampled value 412 to the gradient circuit 413. The down-sampling circuit 411 may perform down-sampling on a sub-block image size of 2×2, 4×4 or any other sub-block image size. The sub-block image size may be adjusted depending on design requirements. In some other embodiments, the down-sampling circuit 411 may calculate an average of intensities of a plurality of adjacent pixels of the current pixel within an adjacent range containing the current pixel and then serve the average as the down-sampled value 412 of the current pixel.

The gradient circuit 413 is coupled to the down-sampling circuit 411 to receive down-sampled value 412. The gradient circuit 413 may calculate a gradient of the current pixel according to the down-sampled value 412 and correspondingly output a gradient value 414 of the current pixel. In some embodiments, the gradient circuit 413 may calculate the gradient of the current pixel along a single direction (e.g., a horizontal direction or a vertical direction of an image frame). In some other embodiments, the gradient circuit 413 may calculate the gradient of the current pixel along multiple different directions.

Figure 5:
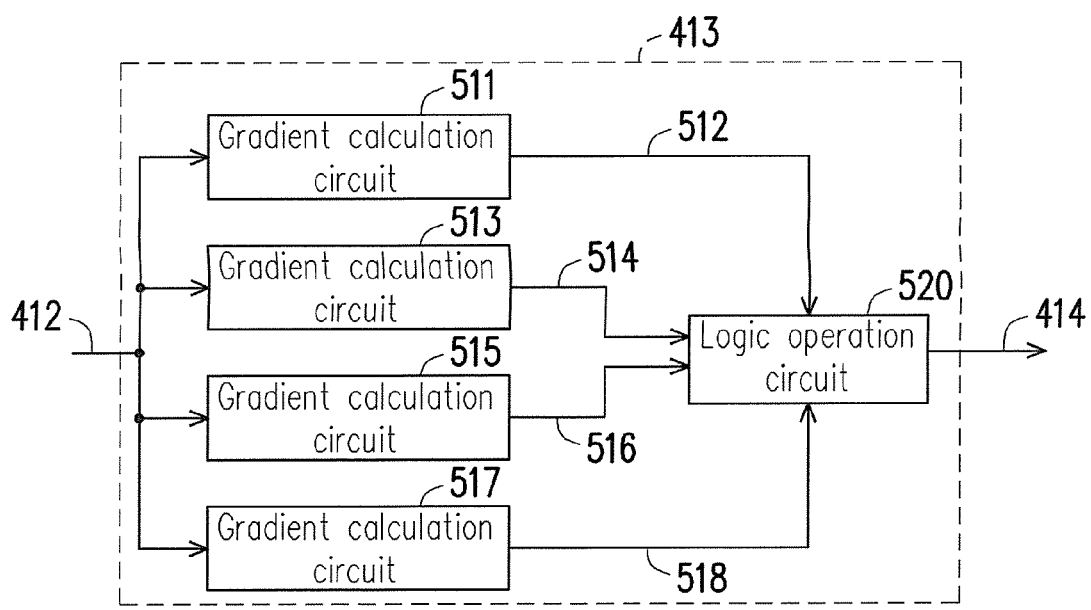
FIG. 5 is a schematic block circuit diagram illustrating the gradient circuit depicted in FIG. 4 according to an embodiment of the invention.

FIG. 5 is a schematic block circuit diagram illustrating the gradient circuit 413 depicted in FIG. 4 according to an embodiment of the invention. Referring to FIG. 5, the gradient circuit 413 includes a plurality of gradient calculation circuits (e.g., a horizontal gradient calculator 511, a vertical gradient calculator 513, a first diagonal gradient calculator 515 and a second diagonal gradient calculator 517 illustrated in FIG. 5) and a logic operation circuit 520. Each of the gradient calculation circuits may calculate one of a plurality of oriented gradient values along a corresponding direction among a plurality of directions by using the down-sampled value 412.

Figures 6, 7, 8, 9:
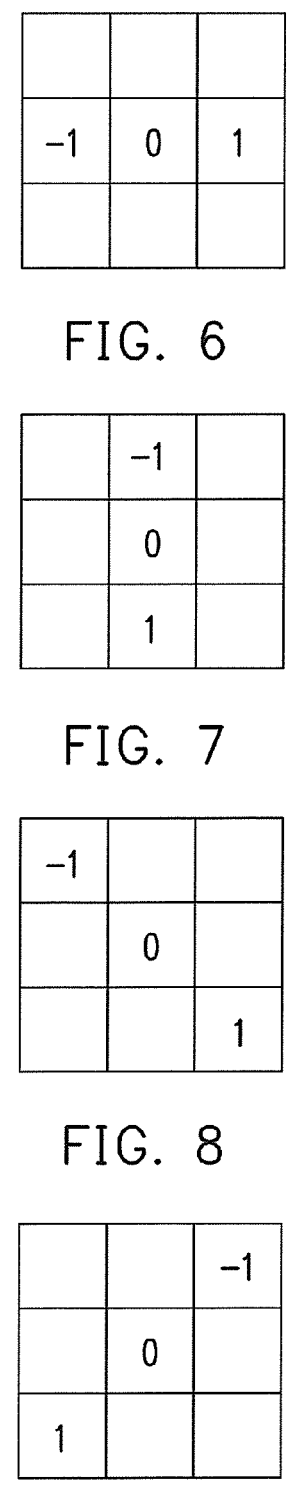

The horizontal gradient calculator 511 may calculate a first oriented gradient value 512 of the current pixel along a horizontal direction of an image frame by using the down-sampled value 412. For example, FIG. 6 is a schematic chart illustrating a scenario of the horizontal gradient calculator 511 depicted in FIG. 5 calculating a gradient value of the current pixel along the horizontal direction of the image frame according to an embodiment of the invention. FIG. 6 illustrates a matrix representing part of the image frame of the down-sampled value 412, where each grid in the matrix represents different pixels of the image frame. The grid marked with "0" in the center of FIG. 6 represents the current pixel, and the grids respectively marked with "−1" and "1" in FIG. 6 represent the adjacent pixels of the current pixel in the horizontal direction. The horizontal gradient calculator 511 may calculate the first oriented gradient value 512 of the current pixel along the horizontal direction of the image frame by using the intensity of the current pixel having the down-sampled value 412 and intensities of the adjacent pixels of the current pixel. The gradient calculation pertains to a conventional skill in the art and thus, will not be repeatedly described.

The vertical gradient calculator 513 may calculate a second oriented gradient value 514 of the current pixel along a vertical direction of the image frame by using the down-sampled value 412. For example, FIG. 7 is a schematic chart illustrating a scenario of the vertical gradient calculator 513 depicted in FIG. 5 calculating a gradient value of the current pixel along the vertical direction of the image frame according to an embodiment of the invention. FIG. 7 illustrates a matrix representing part of the image frame of the down-sampled value 412, where each grid in the matrix represents different pixels of the image frame. The grid marked with "0" in the center of FIG. 7 represents the current pixel, and the grids respectively marked with "−1" and "1" in FIG. 7 represent the adjacent pixels of the current pixel in the vertical direction. The vertical gradient calculator 513 may calculate the second oriented gradient value 514 of the current pixel along the vertical direction by using the intensity of the current pixel having the down-sampled value 412 and intensities of the adjacent pixels of the current pixel.

The first diagonal gradient calculator 515 may calculate a third oriented gradient value 516 of the current pixel along a first oblique direction (e.g., a diagonal direction) of the image frame by using the down-sampled value 412. For example, FIG. 8 is a schematic chart illustrating a scenario of the first diagonal gradient calculator 515 depicted in FIG. 5 calculating a gradient value of the current pixel along a diagonal direction of the image frame according to an embodiment of the invention. FIG. 8 illustrates a matrix representing part of the image frame of the down-sampled value 412, where each grid in the matrix represents different pixels of the image frame. The grid marked with "0" in the center of FIG. 8 represents the current pixel, and the grids respectively marked with "−1" and "1" in FIG. 8 represent the adjacent pixels of the current pixel in the diagonal direction. The first diagonal gradient calculator 515 may calculate the third oriented gradient value 516 of the current pixel along the diagonal direction by using the intensity of the current pixel having the down-sampled value 412 and intensities of the adjacent pixels of the current pixel.

The second diagonal gradient calculator 517 may calculate fourth oriented gradient value 518 of the current pixel along a second oblique direction (e.g., anti-diagonal direction) of the image frame by using the down-sampled value 412. For example, FIG. 9 is a schematic chart illustrating a scenario of the second diagonal gradient calculator 517 depicted in FIG. 5 calculating a gradient value of the current pixel along an anti-diagonal direction of the image frame according to an embodiment of the invention. FIG. 9 illustrates a matrix representing part of the image frame of the down-sampled value 412, where each grid in the matrix represents different pixels of the image frame. The grid marked with "0" in the center of FIG. 9 represents the current pixel, and the grids respectively marked with "−1" and "1" in FIG. 9 represent the adjacent pixels of the current pixel in the anti-diagonal direction. The second diagonal gradient calculator 517 may calculate the fourth oriented gradient value 518 of the current pixel along the anti-diagonal direction by using the intensity of the current pixel having the down-sampled value 412 and intensities of the adjacent pixels of the current pixel.

Referring to FIG. 5, the logic operation circuit 520 is coupled to gradient calculation circuits 511, 513, 515, 517 to receive the oriented gradient values, such as the first oriented gradient value 512, the second oriented gradient value 514, the third oriented gradient value 516 and the fourth oriented gradient value 518. The logic operation circuit 520 may calculate the gradient value 414 of the current pixel by using at least one of the oriented gradient values. For example (but not limited to), the logic operation circuit 520 may select the maximum from the first oriented gradient value 512, the second oriented gradient value 514, the third oriented gradient value 516 and the fourth oriented gradient value 518 to serve as the gradient value 414 of the current pixel. The logic operation circuit 520 may output the gradient value 414 to the conversion circuit 415.

Referring to FIG. 4, the conversion circuit 415 is coupled to the gradient circuit 413 to receive the gradient value 414. The conversion circuit 415 may convert the gradient value 414 into the first feature coefficient $C_1$ of the current pixel and provide it to the determination module 112. The conversion circuit 415 may convert the gradient value 414 into the first feature coefficient $C_1$ of the current pixel in any manner. For example (but not limited to), the conversion circuit 415 may convert the gradient value 414 into the first feature coefficient $C_1$ of the current pixel according to a specific conversion function, a specific linear curve, a specific piece-wise linear curve or a specific non-linear curve. A value range of the first feature coefficient $C_1$ may be determined depending on design requirements. In some application examples, the first feature coefficient $C_1$ may be a real number between 0 and 1.

Figure 10:
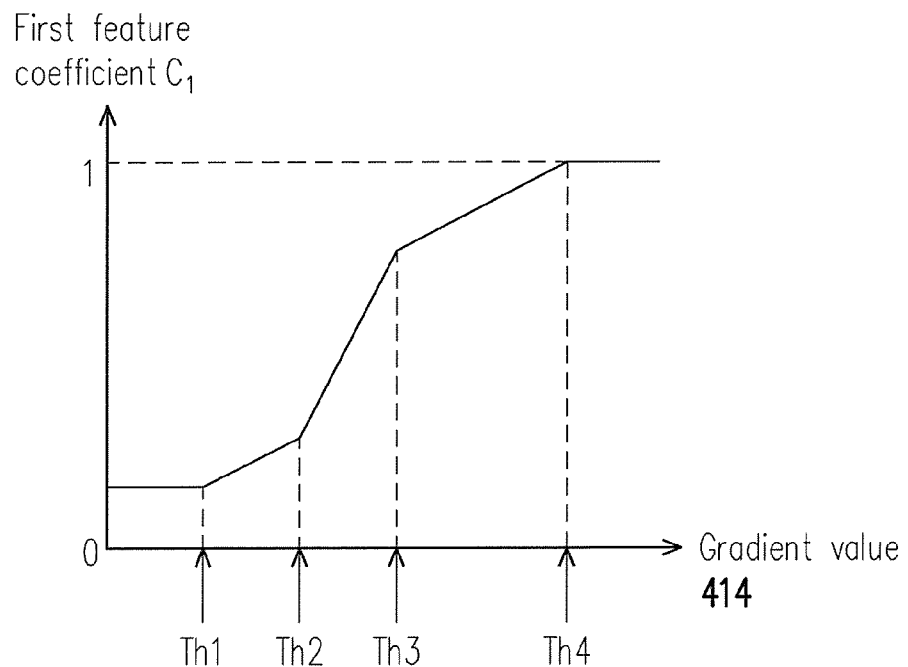
FIG. 10 is a schematic graph illustrating the conversion circuit depicted in FIG. 4 converting the gradient value into the first feature coefficient according to an embodiment of the invention.

FIG. 10 is a schematic graph illustrating the conversion circuit 415 depicted in FIG. 4 converting the gradient value 414 into the first feature coefficient $C_1$ according to an embodiment of the invention. In FIG. 10, the horizontal axis represents the gradient value 414, and the vertical axis represents the first feature coefficient $C_1$. FIG. 10 illustrates an example of a piece-wise linear curve, where the gradient value 414 is divided into 5 intervals by thresholds Th1, Th2, Th3 and Th4. The conversion circuit 415 converts the gradient value 414 into the first feature coefficient $C_1$ by using different linear curves within the 5 intervals, respectively.

Referring to FIG. 4, the texture detection unit of the detection module 111_2 includes a horizontal feature circuit 421, a vertical feature circuit 423, a merging circuit 425 and a conversion circuit 427. The horizontal feature circuit 421 may calculate a horizontal feature of the current pixel and correspondingly output a horizontal feature value $F_H$. Namely, the horizontal feature circuit 421 may detect texture information with respect to the current pixel along the horizontal direction within an adjacent range. For example (but not limited to), the horizontal feature circuit 421 may calculate equation (1) or equation (2) as below and output the horizontal feature value $F_H$ of the current pixel, where I(i,j) represents a value of a pixel having a location of (i,j) within an M*N adjacent range containing the current pixel, and M and N are positive integers. M and N (i.e., numbers of rows and columns) of the adjacent range may be determined depending on design requirements.

$$F_H = \sum_{i=0}^{M} |I(i, 1) - I(i, N)| \quad \text{Equation (1)}$$

$$F_H = \sum_{i=0}^{M} [I(i, 1) - I(i, N)] \quad \text{Equation (2)}$$

The vertical feature circuit 423 may calculate a vertical feature of the current pixel and correspondingly output a vertical feature value $F_V$. Namely, the vertical feature circuit 423 may detect texture information with respect to the current pixel along the vertical direction within the adjacent range. For example (but not limited to), the vertical feature circuit 423 may calculate equation (3) or equation (4) as below and output the vertical feature value $F_V$ of the current pixel, where I(i,j) represents a value of a pixel having a location of (i,j) within an M*N adjacent range containing the current pixel.

$$F_V = \sum_{j=0}^{N} |I(1, j) - I(M, j)| \quad \text{equation (3)}$$

$$F_V = \sum_{j=0}^{N} [I(1, j) - I(M, j)] \quad \text{equation (4)}$$

The merging circuit 425 is coupled to the horizontal feature circuit 421 and the vertical feature circuit 423 to receive the horizontal feature value $F_H$ and the vertical feature value $F_V$. The merging circuit 425 may merge the horizontal feature value $F_H$ with the vertical feature value $F_V$ and correspondingly output a merged feature value 426 of the current pixel. For example (but not limited to), in some embodiments, the merging circuit 425 may calculate a sum of the horizontal feature value $F_H$ and the vertical feature value $F_V$ to serve as the merged feature value 426 of the current pixel. In some other embodiments, the merging circuit 425 may calculate an average of the horizontal feature value $F_H$ and the vertical feature value $F_V$ to serve as the merged feature value 426 of the current pixel.

The conversion circuit 427 is coupled to the merging circuit 425 to receive the merged feature value 426. The conversion circuit 427 may convert the merged feature value 426 into the second feature coefficient $C_2$ of the current pixel and provide it to the determination module 112. The conversion circuit 427 may convert the merged feature value 426 into the second feature coefficient $C_2$ of the current pixel in any manner. For example (but not limited to), the conversion circuit 427 may convert the merged feature value 426 into the second feature coefficient $C_2$ of the current pixel according to a specific conversion function, a specific linear curve, a specific piece-wise linear curve or a specific non-linear curve. A value range of the second feature coefficient $C_2$ may be determined depending on design requirements. In some application examples, the second feature coefficient $C_2$ may be a real number between 0 and 1.

Figure 11:
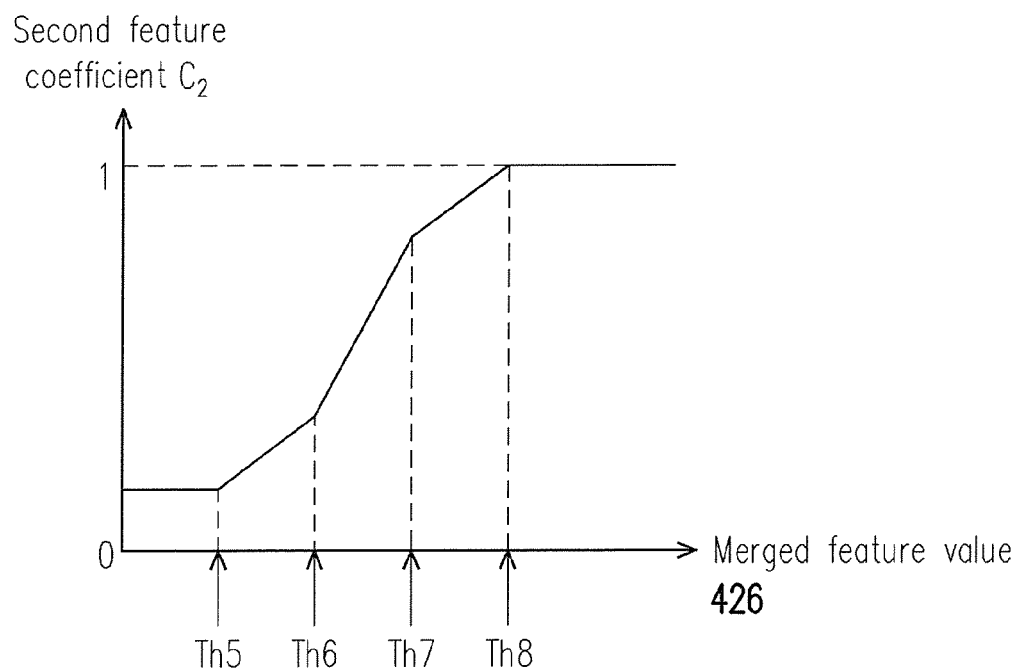
FIG. 11 is a schematic graph illustrating the conversion circuit depicted in FIG. 4 converting the merged feature value into the second feature coefficient according to an embodiment of the invention.

FIG. 11 is a schematic graph illustrating the conversion circuit 427 depicted in FIG. 4 converting the merged feature value 426 into the second feature coefficient $C_2$ according to an embodiment of the invention. In FIG. 11, the horizontal axis represents the merged feature value 426, and the vertical axis represents the second feature coefficient $C_2$. FIG. 11 illustrates an example of a piece-wise linear curve, where the merged feature value 426 is divided into 5 intervals by thresholds Th5, Th6, Th7 and Th8. The conversion circuit 427 converts the merged feature value 426 into the second feature coefficient $C_2$ by using different linear curves within the 5 intervals, respectively.

Referring to FIG. 4, the determination module 112 may determine the false contour coefficient $C_{fc}$ according to the first feature coefficient $C_1$ and the second feature coefficient $C_2$ and output the false contour coefficient $C_{fc}$ to the false contour reduction circuit 120. In some embodiments, the determination module 112 may select the minimum of the first feature coefficient $C_1$ and the second feature coefficient $C_2$ to serve as the false contour coefficient $C_{fc}$ of the current pixel. In some other embodiments, the determination module 112 may calculate an average of the first feature coefficient $C_1$ and the second feature coefficient $C_2$ to serve as the false contour coefficient $C_{fc}$ of the current pixel. Thus, the false contour detection circuit 110 may recognize an edge (e.g., a strong edge or a weak edge illustrated in FIG. 2) and a texture (e.g., a coarse texture or a fine texture illustrated in FIG. 2) in the image, so as to enhance the accuracy of recognizing the false contour.

It should be noted that in different embodiments, the function (or the operation method) related to each of the false contour detection circuit 110, the detection modules 111_1 to 111_2, the determination module 112, the down-sampling circuit 411, the gradient circuit 413, the conversion circuit 415, the horizontal feature circuit 421, the vertical feature circuit 423, the merging circuit 425, the conversion circuit 427, the gradient calculation circuits, the horizontal gradient calculator 511, the vertical gradient calculator 513, the first diagonal gradient calculator 515, the second diagonal gradient calculator 517, the logic operation circuit 520 and/or false contour reduction circuit 120 may be implemented as software, firmware or hardware by using general programming languages (e.g., C or C++), hardware description languages (e.g., Verilog HDL or VHDL) or any other applicable programming languages. The software (or firmware) capable of executing the related functions may be deployed as any computer-accessible media, such as magnetic tapes, semiconductor memories, magnetic disks or compact disks (e.g., CD-ROMs or DVD-ROMs). Alternatively, the software (or firmware) capable of executing the related functions may be transmitted or delivered through the Internet, the wired communication, the wireless communication or any other communication medium. The software (or firmware) may be stored in a computer-accessible medium (e.g., a memory), such that a processor of the computer may access/execute the programming codes of the software (or firmware) to execute the related functions.

Figure 12:
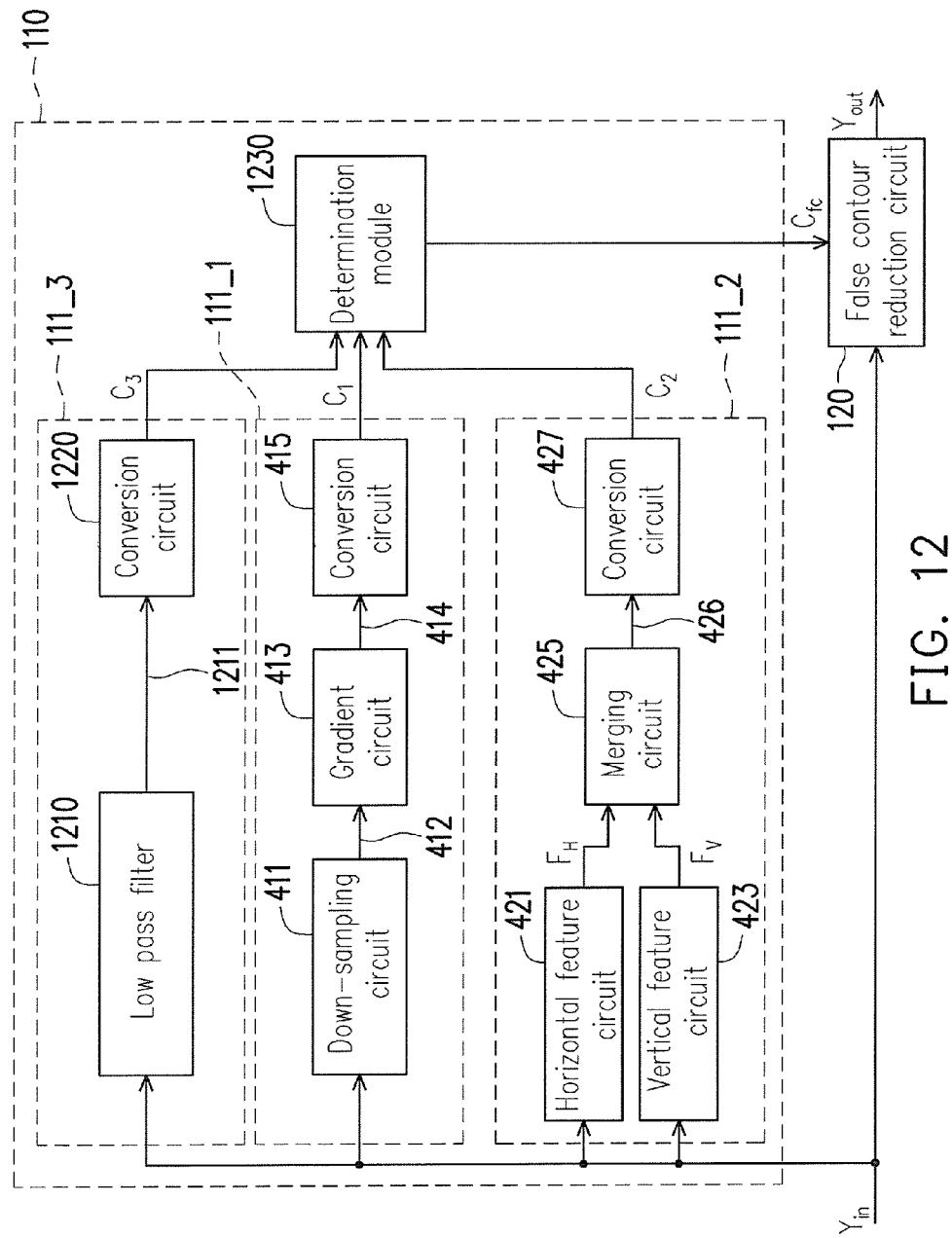
FIG. 12 is a schematic block diagram illustrating the false contour detection circuit depicted in FIG. 1 according to another embodiment of the invention.

FIG. 12 is a schematic block diagram illustrating the false contour detection circuit depicted in FIG. 1 according to another embodiment of the invention Referring to FIG. 12, the false contour detection circuit 110 includes a detection modules 111_1, a detection modules 111_2, a detection modules 111_3 and a determination module 1230. The detection modules 111_1 includes an edge detection unit, the detection modules 111_2 includes a texture detection unit, and the detection modules 111_3 includes a low-frequency area detection unit. The edge detection unit of the detection module 111_1 is coupled to the determination module 1230. The edge detection unit of the detection module 111_1 may detect whether a current pixel of the image input signal $Y_{in}$ is an edge and correspondingly output the first feature coefficient $C_1$ to the determination module 1230. The texture detection unit of the detection module 111_2 is coupled to the determination module 1230. The texture detection unit of the detection module 111_2 may detect a texture in an adjacent range of the current pixel and correspondingly output a second feature coefficient $C_2$ to the determination module 1230. Therein, the detection modules 111_1 and the detection modules 111_2 may refer to the description with respect to the detection modules 111_1 and detection modules 111_2 illustrated in FIG. 1 through FIG. 11 and thus, will not be repeatedly described.

In the embodiment illustrated in FIG. 12, the low-frequency area detection unit of the detection modules 111_3 is coupled to the determination module 1230 and configured to detect whether the current pixel belongs to a low-frequency area and correspondingly output a third feature coefficient $C_3$ to the determination module 1230. The determination module 1230 may determine the false contour coefficient $C_{fc}$ according to the first feature coefficient $C_1$, the second feature coefficient $C_2$ and the third feature coefficient $C_3$, and output the false contour coefficient $C_{fc}$ to the false contour reduction circuit 120. Thus, the false contour detection circuit 110 may recognize a low-frequency component, an edge (e.g., a strong edge or a weak edge illustrated in FIG. 2) and a texture (e.g., a coarse texture or a fine texture illustrated in FIG. 2) in the image input signal $Y_{in}$, so as to enhance the accuracy of recognizing the false contour.

The low-frequency area detection unit of the detection modules 111_3 includes a low pass filter 1210 and a conversion circuit 1220. The low pass filter 1210 may filter a high-frequency component out of the image input signal $Y_{in}$ and correspondingly output a filtered signal 1211 to the conversion circuit 1220. Generally speaking, strong edges and coarse textures in an image include high-frequency components. Thus, the low pass filter 1210 may filter the strong edges and the coarse textures from the image and output the low-frequency component of the image input signal $Y_{in}$ to the conversion circuit 1220.

The conversion circuit 1220 is coupled to the low pass filter 1210 to receive the filtered signal 1211. The conversion circuit 1220 may convert the filtered signal 1211 into the third feature coefficient $C_3$ of the current pixel and provide it to the determination module 1230. The conversion circuit 1220 may convert the filtered signal 1211 into the third feature coefficient $C_3$ of the current pixel in any manner. For example (but not limited to), the conversion circuit 1220 may convert the filtered signal 1211 into the third feature coefficient $C_3$ according to a specific conversion function, a specific linear curve, a specific piece-wise linear curve or a specific non-linear curve. A value range of the third feature coefficient $C_3$ may be determined depending on design requirements. In some application examples, the third feature coefficient $C_3$ may be a real number between 0 and 1.

Figure 13:
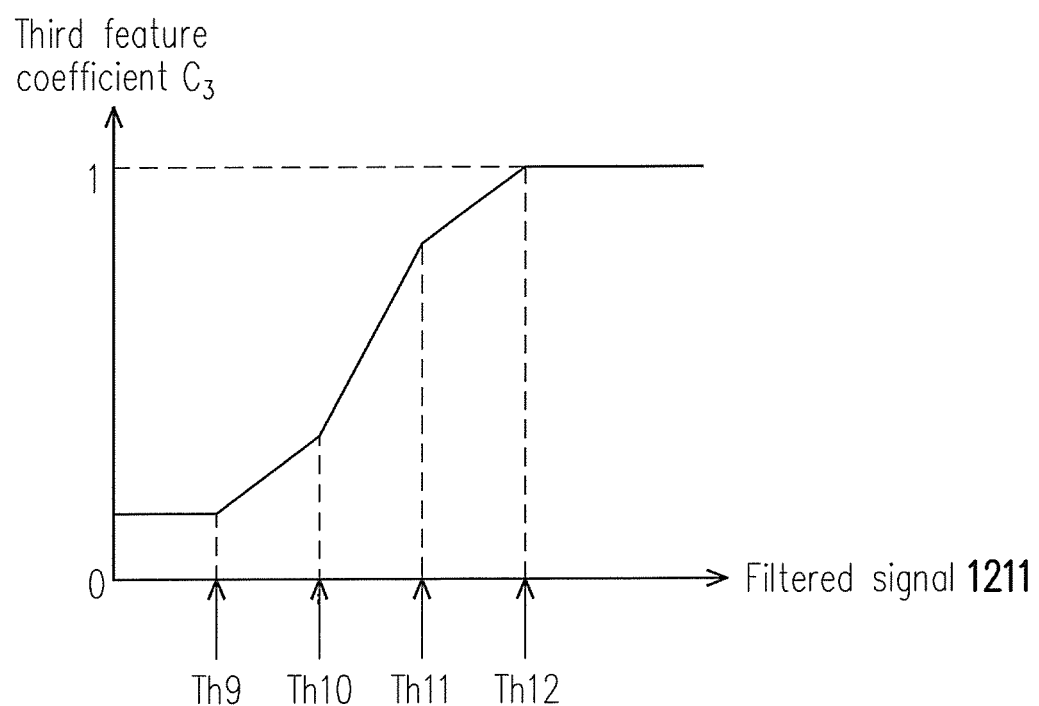
FIG. 13 is a schematic graph illustrating the conversion circuit depicted in FIG. 12 converting the filtered signal into the third feature coefficient according to an embodiment of the invention.

FIG. 13 is a schematic graph illustrating the conversion circuit 1220 depicted in FIG. 12 converting the filtered signal 1211 into the third feature coefficient $C_3$ according to an embodiment of the invention. In FIG. 13, the horizontal axis represents the filtered signal 1211, and the vertical axis represents the third feature coefficient $C_3$. FIG. 13 illustrates an example of a piece-wise linear curve, where the filtered signal 1211 is divided into 5 intervals by thresholds Th9, Th10, Th11 and Th12. The conversion circuit 1220 converts the filtered signal 1211 into the third feature coefficient $C_3$ by using different linear curves within the 5 intervals, respectively.

Referring to FIG. 12, the determination module 1230 may determine false contour coefficient $C_{fc}$ according to the first feature coefficient $C_1$, the second feature coefficient $C_2$ and the third feature coefficient $C_3$ and output the false contour coefficient $C_{fc}$ to the false contour reduction circuit 120. In some embodiments, the determination module 1230 may select one (e.g., the minimum, the median or the maximum) of the first feature coefficient $C_1$, the second feature coefficient $C_2$ and the third feature coefficient $C_3$ to serve as the false contour coefficient $C_{fc}$ of the current pixel. In some other embodiments, the determination module 1230 may calculate an average of the first feature coefficient $C_1$, the second feature coefficient $C_2$ and the third feature coefficient $C_3$ to serve as the false contour coefficient $C_k$ of the current pixel. Thus, the false contour detection circuit 110 may recognize a low-frequency component, an edge (e.g., a strong edge or a weak edge illustrated in FIG. 2) and a texture (e.g., a coarse texture or a fine texture illustrated in FIG. 2) in the image, so as to enhance the accuracy of recognizing the false contour.

It should be noted that in different embodiments, the function (or the operation method) related to each of the detection modules 111_3, the low pass filter 1210, the conversion circuit 1220 and/or the determination module 1230 may be implemented as software, firmware or hardware by using general programming languages (e.g., C or C++), hardware description languages (e.g., Verilog HDL or VHDL) or any other applicable programming languages. The software (or firmware) capable of executing the related functions may be deployed as any computer-accessible media, such as magnetic tapes, semiconductor memories, magnetic disks or compact disks (e.g., CD-ROMs or DVD-ROMs). Alternatively, the software (or firmware) capable of executing the related functions may be transmitted or delivered through the Internet, the wired communication, the wireless communication or any other communication medium. The software (or firmware) may be stored in a computer-accessible medium (e.g., a memory), such that a processor of the computer may access/execute the programming codes of the software (or firmware) to execute the related functions.

Figure 14:
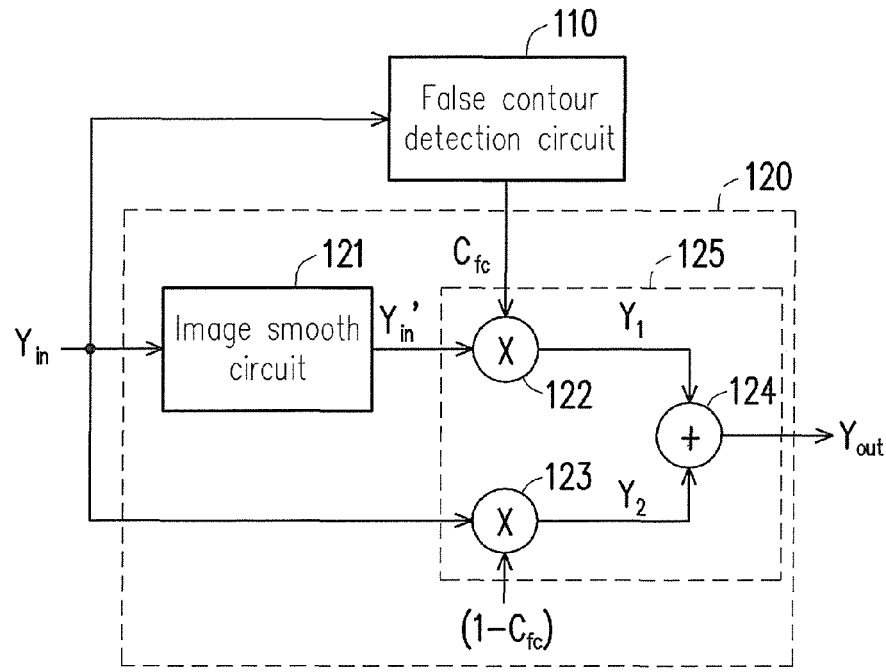
FIG. 14 is a schematic block diagram illustrating the false contour reduction circuit depicted in FIG. 1 according to an embodiment of the invention.

FIG. 14 is a schematic block diagram illustrating the false contour reduction circuit 120 depicted in FIG. 1 according to an embodiment of the invention. Referring to FIG. 14, the false contour reduction circuit 120 includes an image smooth circuit 121 and a combiner 125. The image smooth circuit 121 may smooth the image input signal $Y_{in}$ and output a smoothed signal $Y_{in}'$. The smooth operation may be inferred with reference to the description with respect to the embodiment illustrated in FIG. 3 or to the content that will set forth below. In some embodiments, the image smooth circuit 121 may smooth the image input signal $Y_{in}$ according to a spatial weight $W_s$ and a range weight $W_r$, so as to output the smoothed signal $Y_{in}'$. After the image input signal $Y_{in}$ is smoothed by the image smooth circuit 121, the false contour is removed. The combiner 125 is coupled to the image smooth circuit 121 to receive the smoothed signal. The combiner 125 is configured to combine the smoothed signal $Y_{in}'$ and the image input signal $Y_{in}$ according to the false contour coefficient $C_{fc}$ of the current pixel, so as to obtain the image output signal $Y_{out}$ of the current pixel.

In the embodiment illustrated in FIG. 14, the combiner 125 comprises a first multiplier 122, a second multiplier 123 and an adder 124. The first multiplier 122 is coupled to the image smooth circuit 121 to receive the smoothed signal $Y_{in}'$ of the current pixel. The first multiplier 122 is coupled to the false contour detection circuit 110 to receive the false contour coefficient $C_{fc}$ of the current pixel. The first multiplier 122 may calculate $Y_1=C_{fc}*Y_{in}'$ to output a first pixel value $Y_1$ of the current pixel. A value range of the false contour coefficient $C_{fc}$ may be determined depending on design requirements. In some application examples, the false contour coefficient $C_{fc}$ may be a real number between 0 and 1.

The second multiplier 123 receives the image input signal $Y_{in}$ of the current pixel. The second multiplier 123 is coupled to the false contour detection circuit 110 to receive the false contour coefficient $C_{fc}$. The second multiplier 123 may calculate $Y_2=(1-C_{fc})*Y_{in}$ to output a second pixel value $Y_2$ of the current pixel. The adder 124 is coupled to the first multiplier 122 and the second multiplier 123 to receive the first pixel value $Y_1$ and the second pixel value $Y_2$. The adder 124 may calculate $Y_{out}=Y_1+Y_2=C_{fc}*Y_{in}'+(1-C_{fc})*Y_{in}$ to output an image output signal $Y_{out}$ of the current pixel.

After the image input signal $Y_{in}$ is smoothed by the image smooth circuit 121, the false contour and the image details are removed. The false contour reduction circuit 120 may perform a weighting and blending operation on the smoothed signal $Y_{in}'$ and the original image input signal $Y_{in}$ dynamically and flexibly according to the false contour map (i.e., the false contour coefficient $C_{fc}$). The pixel positions with the higher probability image frame for the false contour to appear in the image frame have the greater values of the false contour coefficients $C_{fc}$, such that the component of the smoothed signal $Y_{in}'$ in the image output signal $Y_{out}$ is dramatically increased. Thus, the false contour may be effectively removed. The pixel positions with the lower probability for the false contour to appear in the image frame have the smaller values of the false contour coefficients $C_{fc}$, such that the component of the original image input signal image input signal $Y_{in}$ in the image output signal $Y_{out}$ is dramatically increased. Thus, the image details (e.g., the weak edges or the fine textures) may remain.

It should be noted that in different embodiments, the function (or the operation method) related to each of the false contour detection circuit 110, the false contour reduction circuit 120, the image smooth circuit 121, the first multiplier 122, the second multiplier 123 and/or the adder 124 may be implemented as software, firmware or hardware by using general programming languages (e.g., C or C++), hardware description languages (e.g., Verilog HDL or VHDL) or any other applicable programming languages.

The software (or firmware) capable of executing the related functions may be deployed as any computer-accessible media, such as magnetic tapes, semiconductor memories, magnetic disks or compact disks (e.g., CD-ROMs or DVD-ROMs). Alternatively, the software (or firmware) capable of executing the related functions may be transmitted or delivered through the Internet, the wired communication, the wireless communication or any other communication medium. The software (or firmware) may be stored in a computer-accessible medium (e.g., a memory), such that a processor of the computer may access/execute the programming codes of the software (or firmware) to execute the related functions.

Figure 15:
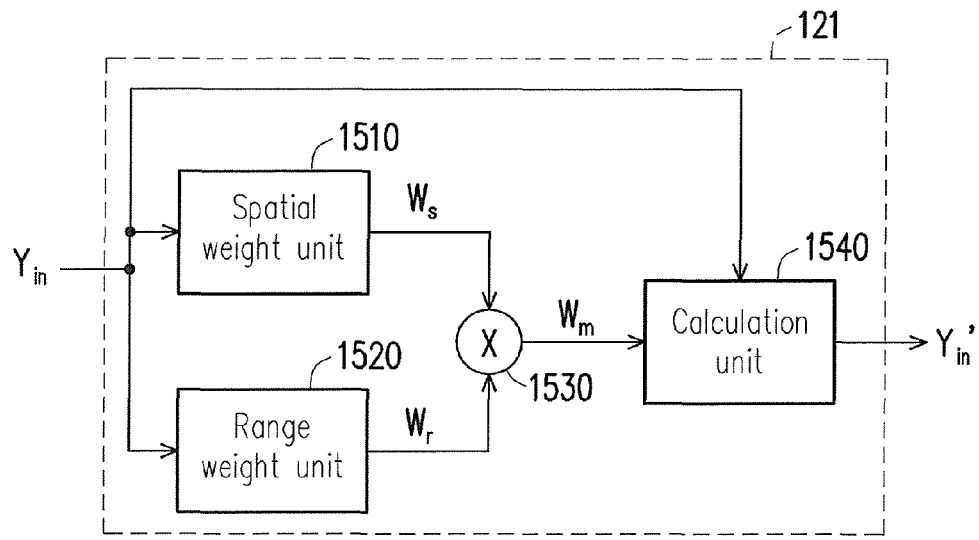
FIG. 15 is a schematic block diagram illustrating the image smooth circuit depicted in FIG. 14 according to an embodiment of the invention.

FIG. 15 is a schematic block diagram illustrating the image smooth circuit 121 depicted in FIG. 14 according to an embodiment of the invention. Referring to FIG. 15, the image smooth circuit 121 includes a spatial weight unit 1510, a range weight unit 1520, a third multiplier 1530 and a calculation unit 1540. The spatial weight unit 1510 may define an adjacent range of the current pixel. For example (but not limited to), in some embodiments, the spatial weight unit 1510 may calculate a Gauss distance for the current pixel by using the Gauss function and determine the adjacent range of the current pixel based on the Gauss distance. In some other embodiments, the spatial weight unit 1510 may determine the adjacent range of the current pixel by using a distance threshold (which is determined depending on design requirements). The adjacent range includes a plurality of adjacent pixels. The spatial weight unit 151 may determine a spatial weight $W_s$ of each of the adjacent pixels according to a spatial distance between the current pixel and each of the adjacent pixels. For example, if it is assumed that a spatial distance from the current pixel $Y_{in}(n)$ to an adjacent pixel $Y_{in}(n-1)$ is 1 "pixel distance", the spatial weight unit 1510 may then determine that the spatial weight $W_s$ of the adjacent pixel $Y_{in}(n-1)$ is w1, while if it is assumed that the spatial distance from the current pixel $Y_{in}(n)$ to the adjacent pixels $Y_{in}(n-2)$ is 2 "pixel distances", the spatial weight unit 1510 may determine that the spatial weight $W_s$ of the adjacent pixels $Y_{in}(n-2)$ is w2, where w2 is less than w1. The values w1 and w2 of the spatial weight $W_s$ may be determined depending on design requirements.

The range weight unit 1520 may define a range window of the current pixel within the adjacent range. The range weight unit 1520 may determine a range weight $W_r$ of each of the adjacent pixels according to a value of the current pixel and the range window. For example, if it is assumed that a distance, $|Y_{in}(n)-Y_{in}(n-1)|$, between the value $Y_{in}(n)$ of the current pixel and the value $Y_{in}(n-1)$ of an adjacent pixel in a range window is 0, the range weight unit 1520 may determine the range weight $W_r$ of the adjacent pixel $Y_{in}(n-1)$ is w3, while if it is assumed that a distance, $|Y_{in}(n)-Y_{in}(n-2)|$ between the value $Y_{in}(n)$ of the current pixel and the value $Y_{in}(n-2)$ of the adjacent pixel in the range window is 2, the range weight unit 1520 may determine the range weight $W_r$ of the adjacent pixel $Y_{in}(n-2)$ is w4, where w4 is less than w3. The values w3 and w4 of the spatial weight $W_r$ may be determined depending on design requirements.

The third multiplier 1530 is coupled to the spatial weight unit 1510 and the range weight unit 1520 to receive the spatial weight $W_s$ and the range weight $W_r$, and may output a weight product $W_m$ of the spatial weight $W_s$ multiplying the range weight $W_r$, where $W_m = W_s * W_r$. The calculation unit 1540 is coupled to the third multiplier 1530 to receive the weight products $W_m$ of the adjacent pixels. The calculation unit 1540 may symmetrize the weight products $W_m$ of the adjacent pixels by using the current pixel as the center to obtain the symmetrized weights $W_m'$ of the adjacent pixels. The calculation unit 1540 may calculate a weighted average of pixel values of the adjacent pixels by using the symmetrized weights $W_m'$ to obtain the smoothed signal $Y_{in}'$ of the current pixel.

Figure 16:
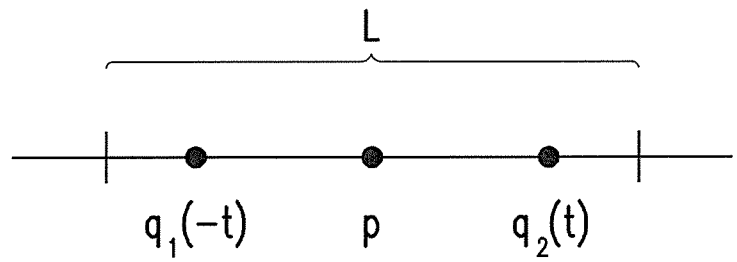
FIG. 16 is a schematic chart illustrating a scenario of the calculation unit depicted in FIG. 15 symmetrizing the weight products of the adjacent pixels according to an embodiment of the invention.

FIG. 16 is a schematic chart illustrating a scenario of the calculation unit 1540 depicted in FIG. 15 symmetrizing the weight products of the adjacent pixels according to an embodiment of the invention. Referring to FIG. 15 and FIG. 16, the calculation unit 1540 may collect the weight products $W_m$ of different pixels provided by the third multiplier 1530 in one image frame. In FIG. 16, a pixel p represents the current pixel, and a range L represents the adjacent range of the current pixel p. There is a plurality of adjacent pixels in the adjacent range L, e.g., adjacent pixels $q_1(-t)$, $q_2(t)$ and more (not shown) as illustrated in FIG. 16. The calculation unit 1540 may define an adjacent range L by using the current pixel p as the center in a 1-D space (e.g., along the horizontal direction of the image frame), so as to select a plurality of spatial symmetrical pixels from the adjacent pixels in the adjacent range L. For example, the calculation unit 1540 may select two spatial symmetrical pixels, e.g., adjacent pixels $q_1(-t)$ and $q_2(t)$, from the adjacent pixels in the adjacent range L. A distance from the adjacent pixel $q_1(-t)$ to the current pixel p is equal to a distance from the adjacent pixel $q_2(t)$ to the current pixel p, the adjacent pixel $q_1(-t)$ and the adjacent pixel $q_2(t)$ are respectively located at opposite sides of the current pixel p, and thus, the adjacent pixels $q_1(-t)$ and $q_2(t)$ are two spatial symmetrical pixels of the current pixel p.

In some embodiments, the calculation unit 1540 may select one of the weight products $W_m$ of the spatial symmetrical pixels to serve as the symmetrized weight $W_m'$ of each of the spatial symmetrical pixels. For example, if it is assumed that the weight product $W_m$ of the adjacent pixel $q_1(-t)$ is w(-t), and the weight product $W_m$ of the adjacent pixel $q_2(t)$ is w(t), the calculation unit 1040 may select the minimum value from w(t) and w(-t) and serve the minimum value as the symmetrized weight $W_m'$ of each of the adjacent pixels $q_1(-t)$ and $q_2(t)$.

In some other embodiments, the calculation unit 1540 may calculate an average of the weight products $W_m$ of the spatial symmetrical pixels to serve as the symmetrized weight $W_m'$ of each of the spatial symmetrical pixels. For example, if it is assumed that the weight product $W_m$ of the adjacent pixel $q_1(-t)$ is w(-t), and the weight product $W_m$ of the adjacent pixel $q_2(t)$ is w(t), the calculation unit 1540 may calculate an average of w(t) and w(-t) and serve the average as the symmetrized weight $W_m'$ of each of the adjacent pixels $q_1(-t)$ and $q_2(t)$.

The calculation unit 1540 may calculate a weighted average of pixel values of the adjacent pixels by using the symmetrized weight $W_m'$ to obtain the smoothed signal $Y_{in}'$ of the current pixel p. For example, the calculation unit 1540 may calculate equation (5) below to obtain the smoothed signal $Y_{in}'(p)$ of the current pixel p. In equation (5), w(t) represents the symmetrized weight $W_m'$ of a $t^{th}$ adjacent pixel in the adjacent range L, and $Y_{in}(t)$ represents an intensity value (e.g., a luminance value) of the $t^{th}$ adjacent pixel.

$$Y_{in}'(p) = \frac{\sum_{t=-L/2}^{L/2} w(t) * Y_{in}(t)}{\sum_{t=-L/2}^{L/2} w(t)} \quad \text{Equation (5)}$$

Figure 17:
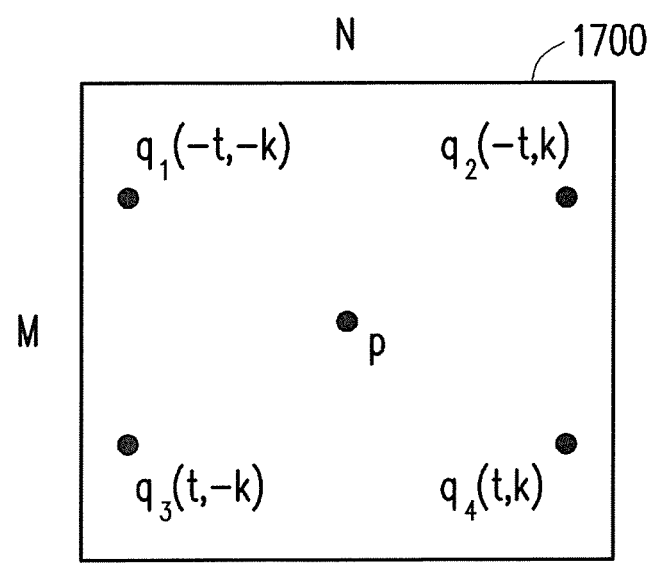
FIG. 17 is a schematic chart illustrating a scenario of the calculation unit depicted in FIG. 15 symmetrizing the weight products of the adjacent pixels according to another embodiment of the invention.

FIG. 17 is a schematic chart illustrating a scenario of the calculation unit 1540 depicted in FIG. 15 symmetrizing the weight products $W_m$ of the adjacent pixels according to another embodiment of the invention. Referring to FIG. 15 and FIG. 17, the calculation unit 1540 collect the weight products $W_m$ of different pixels provided by the third multiplier 1530 in one image frame. In FIG. 17, a pixel p represents the current pixel, and a range 1700 represents the adjacent range of the current pixel p. There is a plurality of adjacent pixels in the adjacent range 1700. In this case, if it is assumed that there are M*N adjacent pixels (where M and N are integers) in the adjacent range 1700, e.g., adjacent pixels $q_1(-t,-k)$, $q_2(-t,k)$, $q_3(t,-k)$, $q_4(t,k)$ and more (not shown) as shown in FIG. 17. The calculation unit 1540 may define the adjacent range 1700 by using the current pixel p as the center in a 2-D space, so as to select a plurality of spatial symmetrical pixels from the adjacent pixels in the adjacent range adjacent range 1700. For example, the calculation unit 1540 may select four spatial symmetrical pixels, e.g., adjacent pixels $q_1(-t,-k)$, $q_2(-t,k)$, $q_3(t,-k)$ and $q_4(t,k)$ from the adjacent pixels in the adjacent range 1700. A distance from the adjacent pixels $q_1(-t,-k)$ to the current pixel p, a distance from the adjacent pixel $q_1(-t,-k)$ to the current pixel p is equal to a distance from the adjacent pixel $q_3(t,-k)$ to the current pixel p, a distance from the adjacent pixel $q_1(-t,-k)$ to the current pixel p is equal to a distance from the adjacent pixel $q_4(t,k)$ to the current pixel p, and thus, the adjacent pixels $q_1(-t,-k)$, $q_2(-t,k)$, $q_3(t,-k)$ and $q_4(t,k)$ are four spatial symmetrical pixels of the current pixel p.

In some embodiments, the calculation unit 1540 may select one of the weight products $W_m$ of the spatial symmetrical pixels to serve as the symmetrized weight $W_m'$ of each of the spatial symmetrical pixels. For example, if it is assumed that the weight product $W_m$ of the adjacent pixel $q_1(-t,-k)$ is $w(-t,-k)$, the weight product $W_m$ of the adjacent pixel $q_2(-t,k)$ is $w(-t,k)$, the weight product $W_m$ of the adjacent pixel $q_3(t,-k)$ is $w(t,-k)$, and the weight product $W_m$ of the adjacent pixel $q_4(t,k)$ is $w(t,k)$, the calculation unit 1540 may select the minimum value from $w(-t,-k)$, $w(-t,k)$, $w(t,-k)$ and $w(t,k)$ and serve the minimum value as the symmetrized weight $W_m'$ of each of the adjacent pixels $q_1(-t,-k)$, $q_2(-t,k)$, $q_3(t,-k)$ and $q_4(t,k)$.

In some other embodiments, the calculation unit 1540 may calculate an average of the weight products $W_m$ of the spatial symmetrical pixels to serve as the symmetrized weight $W_m'$ of each of the spatial symmetrical pixels. For example, if it is assumed that the weight product $W_m$ of the adjacent pixel $q_1(-t,-k)$ is $w(-t,-k)$, the weight product $W_m$ of the adjacent pixel $q_2(-t,k)$ is $w(-t,k)$, the weight product $W_m$ of the adjacent pixel $q_3(t,-k)$ is $w(t,-k)$, and the weight product $W_m$ of the adjacent pixel $q_4(t,k)$ is $w(t,k)$, the calculation unit 1540 may calculate an average of $w(-t,-k)$, $w(-t,k)$, $w(t,-k)$ and $w(t,k)$ and serve the average as the symmetrized weight $W_m'$ of each of the adjacent pixels $q_1(-t,-k)$, $q_2(-t,k)$, $q_3(t,-k)$ and $q_4(t,k)$.

The calculation unit 1540 may calculate a weighted average of pixel values of the adjacent pixels in the adjacent range 1700 by using the symmetrized weight $W_m'$ to obtain the smoothed signal $Y_{in}'$ of the current pixel p. For example, the calculation unit 1540 may calculate equation (6) below to obtain the smoothed signal $Y_{in}'(p)$ of the current pixel p. In equation (6), represents the symmetrized weight $W_m'$ of an adjacent pixel arranged in the $t^{th}$ row and the $k^{th}$ column in the adjacent range 1700 (e.g., e.g., the adjacent pixel $q_4(t,k)$ or any other pixel in the adjacent range 1700), and $Y_{in}(t,k)$ represents an intensity value (e.g., a luminance value) of the adjacent pixel arranged in the $t^{th}$ row and the $k^{th}$ column.

$$Y_{in}'(p) = \frac{\sum_{t=-M/2}^{M/2}\sum_{k=-N/2}^{N/2} w(t,k) * Y_{in}(t,k)}{\sum_{t=-M/2}^{M/2}\sum_{k=-N/2}^{N/2} w(t,k)} \quad \text{Equation (6)}$$

Thus, the image smooth circuit 121 may calculate a weighted average of the pixel values of the plurality of adjacent pixels by using the current pixel p as the center, so as to obtain the smoothed signal $Y_{in}'$ of the current pixel p.

It should be noted that in different embodiments, the function (or the operation method) related to each of the spatial weight unit 1510, the range weight unit 1520, the third multiplier 1530 and/or the calculation unit 1540 may be implemented as software, firmware or hardware by using general programming languages (e.g., C or C++), hardware description languages (e.g., Verilog HDL or VHDL) or any other applicable programming languages. The software (or firmware) capable of executing the related functions may be deployed as any computer-accessible media, such as magnetic tapes, semiconductor memories, magnetic disks or compact disks (e.g., CD-ROMs or DVD-ROMs). Alternatively, the software (or firmware) capable of executing the related functions may be transmitted or delivered through the Internet, the wired communication, the wireless communication or any other communication medium. The software (or firmware) may be stored in a computer-accessible medium (e.g., a memory), such that a processor of the computer may access/execute the programming codes of the software (or firmware) to execute the related functions.

In light of the foregoing, the image processing apparatus and the image processing method provided by the embodiments of the invention can detect different features of the same image input signal. The determination module can determine the false contour coefficient according to the different features, so as to output the false contour coefficient to the false contour reduction circuit. The false contour reduction circuit recognize the false contour in the image according to the false contour coefficient $C_{fc}$ to perform the false contour reduction on the image input signal $Y_{in}$, and thereby the image details (e.g., the weak edges or the fine textures) can be prevented from being lost.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. An image processing apparatus, comprising:
 a false contour detection circuit, configured to detect an image input signal, wherein the false contour detection circuit comprises a plurality of detection modules and a determination module, the detection modules respectively detect different features of the image input signal and correspondingly output a plurality of feature coefficients, and the determination module is coupled to the detection modules to determine a false contour coefficient by using the feature coefficients; and a false contour reduction circuit, coupled to the determination module of the false contour detection circuit to receive the false contour coefficient, and configured to perform false contour reduction on the image input signal according to the false contour coefficient, so as to correspondingly output an image output signal, wherein the detection modules comprise:

a low-frequency area detection unit, coupled to the determination module, and configured to detect whether a current pixel belongs to a low-frequency area and correspondingly output a third feature coefficient among the feature coefficients to the determination module.

2. The image processing apparatus according to claim 1, wherein the detection modules further comprise:

an edge detection unit, coupled to the determination module, and configured to detect whether the current pixel of the image input signal is an edge and correspondingly output a first feature coefficient among the feature coefficients to the determination module; and a texture detection unit, coupled to the determination module, and configured to detect a texture in an adjacent range of the current pixel and correspondingly output a second feature coefficient among the feature coefficients to the determination module.

3. The image processing apparatus according to claim 2, wherein the edge detection unit comprises:

a down-sampling circuit, configured to down-sample the current pixel and correspondingly output a down-sampled value;

a gradient circuit, coupled to the down-sampling circuit to receive the down-sampled value, and correspondingly output a gradient value of the current pixel; and a conversion circuit, coupled to the gradient circuit to receive the gradient value, configured to convert the gradient value into the first feature coefficient of the current pixel to provide to the determination module.

4. The image processing apparatus according to claim 3, wherein the gradient circuit comprises:

a plurality of gradient calculation circuits, each configured to calculate one of a plurality of oriented gradient values along a corresponding direction among a plurality of directions by using the down-sampled value; and a logic operation circuit, coupled to the gradient calculation circuits to receive the oriented gradient values, and configured to calculate the gradient value of the current pixel by using at least one of the oriented gradient values.

5. The image processing apparatus according to claim 3, wherein the conversion circuit converts the gradient value into the first feature coefficient of the current pixel according to a non-linear curve.

6. The image processing apparatus according to claim 2, wherein the texture detection unit comprises:

a horizontal feature circuit, configured to calculate horizontal feature of the current pixel and correspondingly output a horizontal feature value;

a vertical feature circuit, configured to calculate vertical feature of the current pixel and correspondingly output a vertical feature value;

a merging circuit, coupled to the horizontal feature circuit and the vertical feature circuit to receive the horizontal feature value and the vertical feature value, configured to merge the horizontal feature value and the vertical feature value and correspondingly output a merged feature value of the current pixel; and a conversion circuit, coupled to the merging circuit to receive the merged feature value, and configured to convert the merged feature value into the second feature coefficient of the current pixel to provide to the determination module.

7. The image processing apparatus according to claim 6, wherein the conversion circuit convert the merged feature value into the second feature coefficient of the current pixel according to a non-linear curve.

8. The image processing apparatus according to claim 1, wherein the low-frequency area detection unit comprises:

a low pass filter, configured to filter a high-frequency component out of the image input signal and correspondingly output a filtered signal; and a conversion circuit, coupled to the low pass filter to receive the filtered signal, and configured to convert the filtered signal into the third feature coefficient of the current pixel to provide to the determination module.

9. The image processing apparatus according to claim 8, wherein the conversion circuit converts the filtered signal into the third feature coefficient of the current pixel according to a non-linear curve.

10. The image processing apparatus according to claim 1, wherein the determination module selects one of the first feature coefficient, the second feature coefficient and the third feature coefficient as the false contour coefficient; or calculates an average of the first feature coefficient, the second feature coefficient and the third feature coefficient to serve as the false contour coefficient.

11. An image processing apparatus, comprising:

a false contour detection circuit, configured to detect an image input signal, wherein the false contour detection circuit comprises a plurality of detection modules and a determination module, the detection modules respectively detect different features of the image input signal and correspondingly output a plurality of feature coefficients, and the determination module is coupled to the detection modules to determine a false contour coefficient by using the feature coefficients; and a false contour reduction circuit, coupled to the determination module of the false contour detection circuit to receive the false contour coefficient, and configured to perform false contour reduction on the image input signal according to the false contour coefficient, so as to correspondingly output an image output signal, wherein the false contour coefficient is a real number between 0 and 1, the false contour reduction circuit comprises:

an image smooth circuit, configured to smooth the image input signal and output a smoothed signal; and a combiner, coupled to the image smooth circuit to receive the smoothed signal, configured to combine the smoothed signal and the image input signal according to the false contour coefficient to obtain the image output signal of a current pixel.

12. The image processing apparatus according to claim 11, wherein the combiner comprises:

a first multiplier, coupled to the image smooth circuit to receive the smoothed signal, coupled to the false contour detection circuit to receive the false contour coefficient, and configured to calculate $Y_1 = C_{fc} * Y_{in}'$ to output a first pixel value of the current pixel, wherein $Y_1$ represents the first pixel value, $C_{fc}$ represents the false contour coefficient of the current pixel, and $Y_{in}'$ represents the smoothed signal of the current pixel;

a second multiplier, coupled to the false contour detection circuit to receive the false contour coefficient, configured to calculate $Y_2=(1-C_{fc})*Y_{in}$ to output a second pixel value of the current pixel, wherein $Y_2$ represents the second pixel value, $C_{fc}$ represents the false contour coefficient, and $Y_{in}$ represents the image input signal of the current pixel; and an adder, coupled to the first multiplier and the second multiplier to receive the first pixel value $Y_1$ and the second pixel value $Y_2$, configured to calculate $Y_{out}=Y_1+Y_2$ to output the image output signal of the current pixel, wherein $Y_{out}$ represents the image output signal of the current pixel.

13. The image processing apparatus according to claim 11, wherein the image smooth circuit smooth the image input signal according to a spatial weight and a range weight and output the smoothed signal.

14. The image processing apparatus according to claim 13, wherein the image smooth circuit comprises:
a spatial weight unit, configured to define an adjacent range of the current pixel and determine the spatial weight of each of a plurality of adjacent pixels according to a spatial distance between the current pixel and each of the adjacent pixels within the adjacent range;
a range weight unit, configured to define a range window of the current pixel within the adjacent range and determine the range weight of each of the adjacent pixels according to a value of the current pixel and the range window;
a third multiplier, coupled to the spatial weight unit and the range weight unit to receive the spatial weight and the range weight, and configured to output a weight product of the spatial weight multiplying the range weight; and
a calculation unit, coupled to the third multiplier to receive the weight products of the adjacent pixels, and configured to symmetrize the weight products of the adjacent pixels by using the current pixel as the center to obtain symmetrized weights of the adjacent pixels and calculate a weighted average of pixel values of the adjacent pixels by using the symmetrized weights to obtain the smoothed signal of the current pixel.

15. An image processing method, adapted for an image processing apparatus, comprising:
detecting different features of an image input signal respectively by a plurality of detection modules, so as to correspondingly generate a plurality of feature coefficients;
determining a false contour coefficient by using the feature coefficients by a determination module; and
performing false contour reduction on the image input signal according to the false contour coefficient, so as to correspondingly output an image output signal,
wherein the step of detecting different features of the image input signal respectively by the detection modules comprises:
detecting whether a current pixel belongs to a low-frequency area and correspondingly outputting a third feature coefficient among the feature coefficients to the determination module by a low-frequency area detection unit.

16. The image processing method according to claim 15, wherein the step of detecting different features of the image input signal respectively by the detection modules further comprises:
detecting whether the current pixel of the image input signal is an edge and correspondingly outputting a first feature coefficient among the feature coefficients to the determination module by an edge detection unit; and
detecting a texture in an adjacent range of the current pixel and correspondingly outputting a second feature coefficient among the feature coefficients to the determination module by a texture detection unit.

17. The image processing method according to claim 16, wherein the step of detecting whether the current pixel of the image input signal is the edge comprises:
down-sampling the current pixel current pixel and correspondingly outputting a down-sampled value;
receiving the down-sampled value and correspondingly outputting a gradient value of the current pixel by a gradient circuit; and
converting the gradient value into the first feature coefficient of the current pixel to provide to the determination module.

18. The image processing method according to claim 17, wherein the step of outputting the gradient value of the current pixel comprises:
calculating a plurality of oriented gradient values of the current pixel respectively along a plurality of directions by using the down-sampled value; and
calculating the gradient value of the current pixel by using at least one of the oriented gradient values.

19. The image processing method according to claim 17, wherein the step of converting the gradient value into the first feature coefficient of the current pixel comprises:
converting the gradient value into the first feature coefficient of the current pixel according to a non-linear curve.

20. The image processing method according to claim 16, wherein the step of detecting the texture in the adjacent range of the current pixel comprises:
calculating horizontal features of the current pixel and correspondingly outputting a horizontal feature value;
calculating vertical features of the current pixel and correspondingly outputting a vertical feature value;
merging the horizontal feature value and the vertical feature value and correspondingly generating a merged feature value of the current pixel; and
converting the merged feature value into the second feature coefficient of the current pixel to provide to the determination module.

21. The image processing method according to claim 20, wherein the step of converting the merged feature value into the second feature coefficient of the current pixel comprises:
converting the merged feature value into the second feature coefficient of the current pixel according to a non-linear curve.

22. The image processing method according to claim 15, wherein the step of detecting whether the current pixel belongs to the low-frequency area comprises:
filtering a high-frequency component out of the image input signal, so as to correspondingly output a filtered signal; and
converting the filtered signal into the third feature coefficient of the current pixel to provide to the determination module.

23. The image processing method according to claim 22, wherein the step of converting the filtered signal into the third feature coefficient of the current pixel comprises:
converting the filtered signal into the third feature coefficient of the current pixel according to a non-linear curve.

24. The image processing method according to claim 15, wherein the step of determining the false contour coefficient by using the feature coefficients comprises:

selecting one of the first feature coefficient, the second feature coefficient and the third feature coefficient as the false contour coefficient; or calculating an average of the first feature coefficient, the second feature coefficient and the third feature coefficient to serve as the false contour coefficient.

25. An image processing method, adapted for an image processing apparatus, comprising:

detecting different features of an image input signal respectively by a plurality of detection modules, so as to correspondingly generate a plurality of feature coefficients;

determining a false contour coefficient by using the feature coefficients by a determination module; and performing false contour reduction on the image input signal according to the false contour coefficient, so as to correspondingly output an image output signal, wherein the false contour coefficient is a real number between 0 and 1, and the step of performing the false contour reduction on the image input signal comprises:

smoothing the image input signal to generate a smoothed signal; and combining the smoothed signal and the image input signal according to the false contour coefficient to obtain the image output signal of a current pixel.

26. The image processing method according to claim 25, wherein the step of combining the smoothed signal and the image input signal comprises:

calculating $Y_1 = C_{fc} * Y_{in}'$ to output a first pixel value of the current pixel, wherein $Y_1$ represents the first pixel value, $C_{fc}$ represents the false contour coefficient of the current pixel, and $Y_{in}'$ represents the smoothed signal of the current pixel;

calculating $Y_2 = (1 - C_{fc}) * Y_{in}$ to output a second pixel value of the current pixel, wherein $Y_2$ represents the second pixel value, $C_{fc}$ represents the false contour coefficient, and $Y_{in}$ represents the image input signal of the current pixel; and calculating $Y_{out} = Y_1 + Y_2$ to output the image output signal of the current pixel, wherein $Y_{out}$ represents the image output signal of the current pixel.

27. The image processing method according to claim 25, wherein the step of smoothing the image input signal comprises:

smoothing the image input signal according to a spatial weight and a range weight, so as to generate the smoothed signal.

28. The image processing method according to claim 27, wherein the step of smoothing the image input signal comprises:

defining an adjacent range of the current pixel;

determining the spatial weight of each of a plurality of adjacent pixels according to a spatial distance between the current pixel and each of the adjacent pixels within the adjacent range;

defining a range window of the current pixel within the adjacent range;

determining the range weight of each of the adjacent pixels according to a value of the current pixel and the range window;

calculating a weight product of the spatial weight multiplying the range weight;

symmetrizing the weight products of the adjacent pixels by using the current pixel as the center to obtain symmetrized weights of the adjacent pixels; and calculating a weighted average of pixel values of the adjacent pixels by using the symmetrized weights to obtain the smoothed signal of the current pixel.

\* \* \* \* \*